No. 774,973. Patented November 15, 1904.

UNITED STATES PATENT OFFICE.

HERBERT BURR ATHA, OF EAST ORANGE, NEW JERSEY.

TREATING SCRAP-STEEL AND RECARBURIZING SAME.

SPECIFICATION forming part of Letters Patent No. 774,973, dated November 15, 1904.

Application filed July 14, 1904. Serial No. 216,566. (No specimens.)

*To all whom it may concern:*

Be it known that I, HERBERT BURR ATHA, residing at East Orange, in the county of Essex and State of New Jersey, have invented certain new and useful Improvements in Treating Scrap-Steel and Recarburizing the Same, of which the following is a full, clear, and exact description, such as will enable others skilled in the art to which it appertains to make and use the same.

My invention relates to certain improvements in recarburizing scrap-steel containing a small amount of carbon and also the product resulting from said process.

As stated in my prior applications, Serial No. 189,606, filed January 18, 1904, and Serial No. 197,466, filed March 10, 1904, it is a well-known fact that scrap-steel containing a small amount of carbon cannot be converted into a high-grade commercial steel without recarburizing in a furnace. I also stated in said applications that various attempts have been made to recarburize said scrap-steel, one by putting coke into the furnace with the steel and another by putting pig-iron into the furnace with the scrap-steel, and that the first method has been found to be unsatisfactory, owing to the fact that before the scrap in the furnace was heated to a temperature sufficiently high to absorb the carbon in the coke the said carbon was driven off. While the method of using pig-iron in the furnace with the scrap has been found to be successful, yet it is more expensive than the invention that I have made.

One of the objects of my present invention is to recarburize scrap-steel and to produce therefrom a high-grade commercial steel in a cheap and efficient manner.

Another object is to prepare the scrap-steel before it is placed in the furnace, so that it can be easily and cheaply handled.

Other objects will appear from the herein description.

In carrying out my invention I preferably prepare the carbon by finely dividing it and placing this finely-divided carbon into small bags or sacks and then mixing the sacks containing the carbon throughout the scrap-steel and pressing the two into bundles formed into cubes of about two feet in dimension. If the pressure is sufficiently great, the receptacles will be broken, and the carbon contained therein will be distributed or intimately mixed with the scrap, particles of carbon being disseminated throughout the bundles. Of course it is to be understood that it is not necessary to break the bags; but in some cases it may be found more useful and efficient to do so. The bundles so prepared are now placed in an open-hearth furnace. The carbon being mixed throughout the bundles, it is not driven off before the temperature of the steel-scrap in the furnace is raised sufficiently high to absorb the carbon. The carbon is therefore not driven off, as has been the case in prior processes, but practically all of it is absorbed by the steel, as the said steel when raised to a certain temperature acts as a sponge and absorbs the carbon that is in contact therewith.

While I have stated that the carbon is to be finely divided, the word "finely" of course is to be understood as being a relative term, as in some cases it is not necessary to divide the carbon so finely as in other cases. I therefore do not wish to confine myself to the exact terms of the process as herein set forth, as it is clear to any one skilled in the art that it may be varied within certain limits without departing from the scope of my invention.

Having described my invention, what I claim as new, and desire to secure by Letters Patent, is—

1. The process of preparing scrap-steel for remelting in an open-hearth furnace, which consists in placing carbon in receptacles and mixing the receptacles with the scrap-steel.

2. The process of preparing scrap-steel for remelting in an open-hearth furnace, which consists in placing finely-divided carbon into receptacles and mixing the receptacles with the scrap-steel.

3. The process of preparing scrap-steel for remelting in an open-hearth furnace, which consists in placing carbon in receptacles, mixing the receptacles with the scrap-steel, and pressing the receptacles and the scrap-steel together into bundles.

4. The process of preparing scrap-steel for remelting in an open-hearth furnace, which consists in placing carbon in receptacles, mixing the receptacles with the scrap-steel, pressing the receptacles and the scrap-steel together, and breaking the receptacles so that the carbon will be released therefrom and mixed with the scrap-steel.

5. The process of preparing scrap-steel for remelting in an open-hearth furnace, which consists in placing finely-divided carbon in receptacles, mixing the receptacles with the scrap-steel, pressing the mixture into bundles, and breaking the receptacles so that the carbon will be released therefrom and mixed with the scrap-steel.

6. The process of preparing scrap-steel for remelting in an open-hearth furnace, which consists in placing carbon into bags or sacks and mixing the sacks containing the carbon with the scrap-steel.

7. The process of preparing scrap-steel for remelting in an open-hearth furnace, which consists in placing carbon in bags or sacks, mixing the sacks containing the carbon with the scrap-steel, and pressing the mixture into bundles.

8. The process of preparing scrap-steel for remelting in an open-hearth furnace, which consists in placing finely-divided carbon in bags or sacks, mixing the sacks containing the carbon with the scrap-steel, pressing the mixture into bundles, and breaking the bags or sacks so that the carbon contained therein will be intimately mixed and distributed with the scrap-steel.

9. The process of recarburizing scrap-steel, which consists in placing carbon in receptacles, mixing the scrap-steel and the receptacles containing the carbon together, pressing the mixture into bundles, placing the bundles in an open-hearth furnace, and raising the temperature of the furnace to such a point that the scrap-steel will absorb the carbon.

10. The process of recarburizing scrap-steel, which consists in placing finely-divided carbon in a sack or other receptacle, mixing the scrap and the sack containing the carbon together, pressing the mixture into bundles, placing the bundles in an open-hearth furnace, and raising the temperature of the furnace to such a point that the steel will absorb the carbon.

11. The process of recarburizing scrap-steel, which consists in placing carbon in a receptacle, mixing the scrap and the receptacle containing the carbon together, pressing the mixture into a bundle, breaking the receptacle, whereby the carbon contained therein will be released and distributed on or intimately mixed with the scrap-steel, placing the bundles in an open-hearth furnace, and raising the temperature of the furnace to such a point that the steel will absorb the carbon.

12. The process of recarburizing scrap-steel, which consists in placing finely-divided carbon in sacks, mixing the scrap and the sacks containing the carbon together, pressing the mixture into bundles, breaking the sacks, whereby the carbon contained therein will be released and distributed on or intimately mixed with the scrap-steel, placing the bundles in an open-hearth furnace, and raising the temperature of the furnace to such a point that the steel will absorb the carbon.

13. A new and improved product, scrap-steel having mixed with it receptacles containing carbon, the whole being pressed into a bundle.

14. A new and improved product, scrap-steel having intimately mixed with it receptacles containing finely-divided carbon, the whole being pressed into bundles.

15. A new and improved product, scrap-steel and bags or sacks containing carbon, the scrap and sacks being intimately mixed and pressed together into bundles.

16. A new and improved product, scrap-steel and sacks or receptacles containing finely-divided carbon, the scrap and sacks being intimately mixed and pressed together into bundles.

In testimony whereof I affix my signature in the presence of two witnesses.

HERBERT BURR ATHA.

Witnesses:
H. M. SEAMANS,
L. B. STREVELL.